United States Patent [19]

Tamura et al.

[11] Patent Number: 4,652,537
[45] Date of Patent: Mar. 24, 1987

[54] PROCESS FOR PREPARING CARBON MONOXIDE PLATINUM CONVERSION CATALYST

[75] Inventors: Takaaki Tamura, Mitaka; Norihiko Fujita, Musashino; Toshio Kawanishi, Yokohama; Chihiro Matsuura, Tokyo, all of Japan

[73] Assignee: Industrial Research Institute, Tokyo, Japan

[21] Appl. No.: 791,393

[22] Filed: Oct. 25, 1985

[30] Foreign Application Priority Data

Oct. 26, 1984 [JP] Japan ............................ 59-223889
Sep. 3, 1985 [JP] Japan ............................ 60-193059

[51] Int. Cl.⁴ .................... B01J 37/34; B01J 31/06; B01J 23/42; B01D 53/54
[52] U.S. Cl. ........................... 502/5; 423/247; 502/159; 502/185
[58] Field of Search ............... 502/5, 159, 185; 423/247

[56] References Cited

U.S. PATENT DOCUMENTS

| | | | |
|---|---|---|---|
| 3,138,560 | 6/1964 | Keith et al. | 502/181 |
| 3,804,779 | 4/1974 | Kent et al. | 502/185 |
| 4,003,979 | 1/1977 | Kanno | 423/247 |
| 4,158,643 | 6/1979 | Sinka | 423/247 |
| 4,212,854 | 7/1980 | Maki et al. | 502/184 |

Primary Examiner—P. E. Konopka
Attorney, Agent, or Firm—Sherman & Shalloway

[57] ABSTRACT

There is provided a process for producing a catalyst to convert carbon monoxide in a gas into carbon dioxide. The process comprises causing activated carbon to absorb an aqueous solution of chloroplatinic acid, reducing the absorbed chloroplatinic acid to platinum with a reducing agent, and decomposing an excess of the reducing agent with hydrogen peroxide. The catalyst contains at least 6 mg of platinum per gram of activated carbon.

14 Claims, 1 Drawing Figure

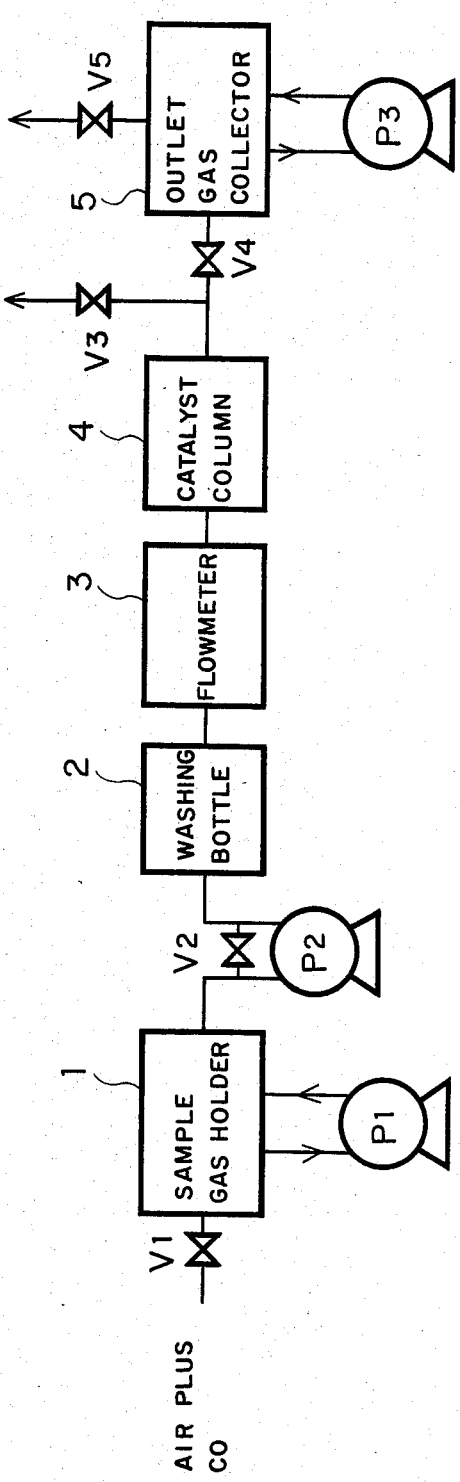

PROCESS FOR PREPARING CARBON MONOXIDE PLATINUM CONVERSION CATALYST

BACKGROUND OF THE INVENTION

1. Field of the Invention

The present invention relates to a process for preparing a carbon monoxide conversion catalyst that converts carbon monoxide contained in a gas such as air into carbon dioxide highly efficiently even at room temperature.

2. Description of the Prior Art

Among catalysts to convert carbon monoxide into carbon dioxide is platinum supported on activated carbon. (See, for example, Japanese Patent Publication No. 36014/1982.) This CO conversion catalyst is produced by treating activated carbon of proper grain size, which has been washed with hydrochloric acid and dried in optional pretreatment, with an aqueous solution of chloroplatinic acid ($H_2PtCl_6$), followed by drying, reducing the chloroplatinic acid with an aqueous solution of $KBH_4$ or the like, followed by rinsing and drying, and finally heating the treated activated carbon at a high temperature in the air. The CO conversion catalyst produced by the conventional process like this is not satisfactory in CO conversion efficiency. Moreover, it sharply decreases in CO conversion efficiency as the flow rate of CO-containing gas increases. There is an instance, for example, where the CO concentration at the exit increases from 20 ppm to 170 ppm as the space velocity increases from 5,300 $hr^{-1}$ to 10,600 $hr^{-1}$.

Another disadvantage of the conventional CO conversion catalyst produced by the above-mentioned process is that it loses its initial catalytic performance to a great extent after it has been left under humid conditions for a long period and its recovery takes a very long time.

SUMMARY OF THE INVENTION

It is an object of the present invention to provide a process for producing a CO conversion catalyst having a much higher conversion efficiency than that produced by the conventional process.

It is another object of the present invention to provide a CO conversion catalyst which exhibits a very high conversion efficiency even under such humid conditions that the CO-containing gas to be treated contains a large amount of moisture.

According to an aspect of the present invention, the process for producing a CO conversion catalyst includes the steps of dipping granular activated carbon in an aqueous or alcoholic solution of chloroplatinic acid, followed by drying, reducing the absorbed chloroplatinic acid with a reducing agent, and removing the residual reducing agent by oxidation with hydrogen peroxide. For the CO conversion catalyst thus produced, the amount of platinum supported on activated carbon is an important factor. In this invention, it is at least 6 mg per gram of activated carbon.

According to another aspect of the present invention, the process includes an additional step of polymerizing on activated carbon a monomer or a mixture of monomers that forms a hydrophobic polymer, thereby modifying activated carbon. This additional step is carried out before the steps for the supporting of platinum on activated carbon. This modification treatment may also be applied to activated carbon which has already supported platinum thereon. The CO conversion catalyst which has undergone the modification treatment maintains a high catalytic activity even when the catalyst is dry or wet.

BRIEF DESCRIPTION OF THE DRAWINGS

The single drawing attached hereto shows an apparatus to test the CO conversion efficiency of the catalyst of this invention.

DETAILED DESCRIPTION OF THE INVENTION

In the process of this invention for producing a CO conversion catalyst, it is possible to use any kind of activated carbon which is used as a carrier for common catalysts. Preferable is activated carbon of coconut husk having an average grain size of about 0.4 mm to 10 mm, which is commercially available from Daiichi Tanso Co., Ltd. under the trade name of "BFG". The activated carbon should preferably undergo pretreatment prior to the supporting of platinum or the modification treatment to be performed prior to the supporting of platinum. This pretreatment includes the steps of dipping activated carbon in b 1N HCl at about 100° C. for 20 hours and washing the dipped activated carbon with distilled water at 100° C. for 40 hours, followed by drying at room temperature.

The supporting of platinum on activated carbon is accomplished by dipping activated carbon in a solution of chloroplatinic acid in water or ethanol, neutralizing the solution with an aqueous solution of sodium carbonate or drying the solution with hot air, and reducing the absorbed chloroplatinic acid with an aqueous solution of $KBH_4$ or $NaBH_4$. The reduction step should preferably be followed by drying and a post-treatment which is the oxidation of the residual reducing agent with hydrogen peroxide. This oxidation post-treatment may be accomplished by shaking the reduced and dried catalyst in 3% hydrogen peroxide solution at room temperature for a proper period of time.

It was experimentally confirmed that the CO conversion catalyst which has undergone drying after the oxidation treatment has a much higher CO conversion efficiency than the one which has undergone simple drying by heating in place of the oxidation treatment. The improvement of CO conversion efficiency takes place only in the case where the amount of platinum supported on activated carbon is more than about 6 mg per gram of activated carbon. The CO conversion efficiency is not improved if the oxidation treatment is carried out by heating in air or by other means than the oxidation with hydrogen peroxide.

The CO conversion catalyst prepared by the above-mentioned process exhibits a very good performance so long as it is used under dry conditions. However, the performance becomes poor more or less under moist conditions. The present invention provides a modified CO conversion catalyst which exhibits a very good performance even if it is wet.

"Modified catalyst" as used herein denotes the catalyst which has undergone the treatment which renders hydrophobic the activated carbon on which platinum has been or will be supported as mentioned above. The modification treatment includes the step of polymerizing a monomer which forms a hydrophobic polymer on the activated carbon carrying or not carrying platinum. Examples of the monomer that forms a hydrophobic polymer include silanes such as trimethoxylvinylsilane and fluorinated olefins such as tetrafluoroethylene. Before or after the modification treatment, platinum as a catalytic substance is supported on activated carbon in the usual way.

In the case of modification treatment with trimethoxyvinylsilane (TMVS), activated carbon is dipped in a 1.0 to 10% solution of TMVS in a mixed solvent of water and acetone, followed by drying. In the case of modification treatment with tetrafluoroethylene (TFE), activated carbon is degassed under a reduced pressure (e.g., $8 \times 10^{-2}$ Torr) and then caused to absorb TFE vapor under pressure until an equilibrium is reached. The monomer deposited on or absorbed by activated carbon polymerizes by itself or by the catalytic action of activated carbon to form a hydrophobic polymer. This polymerization reaction is remarkably accelerated by irradiation with $\gamma$-rays or other radiation. The dose is not critical, and good results are obtained with $3.7 \times 10^3$ to $2.4 \times 10^6$ rad in the case of TMVS and with $4.8 \times 10^4$ to $2.3 \times 10^6$ rad in the case of TFE. An excessively small amount of dose does not produce a satisfactory irradiation effect and an excess dose rather decreases the irradiation effect.

Experimental results indicate that when used under dry conditions, the modified catalyst tends to be a little lower in CO conversion efficiency as compared with the unmodified one. In such a case, it is desirable to use the two catalysts mixed together.

EXAMPLE 1

For pretreatment, 300 g of activated carbon ("BFG", a product of Daiichi Tanso Co., Ltd.) was dipped in 2 liters of 5% hydrochloric acid at 90° C. for 1 hour, followed by rinsing and drying at 120° C. for 2 hours.

The pretreated activated carbon was dipped in 1.5 liters of aqueous solution containing 16.2 g of $H_2PtCl_6 \cdot 6H_2O$ (about 6.1 g as Pt) with occasional shaking at 90° C. for 4 hours. To this mixture was slowly added with stirring at room temperature over 30 minutes 900 ml of aqueous solution containing 60 g of $Na_2CO_3$. The mixture was cooled to 0° C., and to the cooled mixture was added slowly dropwise over 2 hours 1.5 liters of aqueous solution containing 10 g of $KBH_4$. The solids were filtered off with suction, followed by rinsing with 10 liters of hot water and drying at 120° C. for 2 hours.

The catalyst thus obtained was shaken in 3 liters of 3% hydrogen peroxide solution at room temperature for 1 hour, followed by drying at 20° C. for 2 hours. The oxidation-treated catalyst is designated as Sample A-1. It contains 20.3 mg of Pt per gram of activated carbon.

For comparison, Sample B-1 (containing 5.2 mg of Pt per gram of activated carbon) was prepared in the same manner as in Sample A-1, except that the amount of $H_2PtCl_6 \cdot 6H_2O$ in the aqueous solution was 4.1 g (about 1.50 g as Pt). Sample B-2 (containing 5.2 mg of Pt per gram of activated carbon) was prepared in the same manner as in Sample B-1, except that the oxidation treatment was not performed. Sample B-3 (containing 20.3 mg of Pt per gram of activated carbon) was prepared in the same manner as in Sample A-1, except that the oxidation treatment was not performed.

Samples A-1, B-1, B-2, and B-3 were examined for CO conversion efficiency by using an apparatus shown in the FIGURE. Feed air containing a known amount of CO is introduced into sample gas holder (1) through valve (V1). Forced by pump (P2), the feed air passes through washing bottle (2) and flowmeter (3) to enter catalyst column (4) (17.7 mm in inside diameter and 50 mm high, having a volume of 11.3 cm$^3$) filled with the catalyst sample. The air which has left catalyst column (4) then passes through valve (V4) and enters outlet gas collector (5). The collected outlet gas is stirred by pump (P3) for a certain time interval and transferred through valve (V5) to a CO analyzer for determination of CO content.

Table 1 shows the results of experiments with Sample A-1 which conforms to the present invention. (The rate of conversion was higher than 99.9%.) The feed air was prepared by adding 2,360 ppm of CO to moist air (not dry air), and it was supplied at room temperature to catalyst column at a space velocity of 5,000 hr$^{-1}$.

TABLE 1

| Time (min) | 1 | 5 | 8 | 10 | 12* | 20* | 32* | 40* |
|---|---|---|---|---|---|---|---|---|
| CO concentration at outlet (ppm) | 2> | 2> | 2> | 2> | 8 | 80 | 2> | 2> |

*Measured at a space velocity of 10,000 hr$^{-1}$.

The same experiment as mentioned above was carried out with Sample B-2, except that the CO concentration at inlet was 1,590 ppm. The average CO concentration at outlet was 700 ppm (the rate of conversion being 5.60%) as measured within 1.5 minutes after the start of experiment; but it rose to 800 ppm after 6 minutes.

In the experiment with Sample B-1 (in which the CO concentration at inlet was 1,590 ppm), the average CO concentration at outlet was 510 ppm (the rate of conversion being 68.01%) as measured within 2 minutes after the start of experiment; but it declined to 412 ppm after 3.5 minutes.

In the experiment with Sample B-3 (in which the CO concentration at inlet was 2,250 ppm), the average CO concentration at outlet was 2 ppm for 10 minutes as long as the space velocity was 5,000 hr$^{-1}$; but, when the space velocity was changed to 10,000 hr$^{-1}$, it rose to 110 ppm after 22 minutes and to 400 ppm after 32 minutes. When the space velocity was reduced to 5,000 hr$^{-1}$ again, it returned to 2 ppm.

The rate of CO conversion was slightly restored with time in the case of Sample B-1, but not in the case of Sample B-2. It is thought that this effect results from the oxidation treatment with hydrogen peroxide solution. They did not exhibit a high rate of CO conversion as compared with Sample A-1, because they contain only 5.2 mg of supported Pt per gram of activated carbon, whereas Sample A-1 contains 20.3 mg of supported Pt per gram of activated carbon.

Sample A-1 conforming to the present invention was compared with Sample B-3 (without oxidation treatment with hydrogen peroxide). (Both samples contain 20.3 mg of Pt per gram of activated carbon.) The CO concentration at outlet was lower than 2 ppm in both cases when the space velocity was 5,000 hr$^{-1}$. In the case of Sample B-3, it increased to 110 to 400 ppm after 12 to 22 minutes, when the space velocity was increased to 10,000 hr$^{-1}$; whereas, in the case of A-1 (with oxidation treatment with hydrogen peroxide), it was 8 ppm after 2 minutes and it temporarily increased to 80 ppm after 10 minutes and then went down to 2 ppm again after 22 minutes and on. Thus A-1 exhibited high activity even at a high space velocity.

EXAMPLE 2

Thirty grams of activated carbon was pretreated in the same manner as in Example 1. The pretreated activated carbon was dipped in 100 ml of aqueous solution containing 1.0 g of $H_2PtCl_6.6H_2O$ (about 0.38 g as Pt) with occasional shaking at 90° C. for 30 minutes, followed by drying at 120° C. for 30 minutes. (This drying with hot air replaces the neutralization with $Na_2CO_3$.) The Pt-loaded activated carbon was dipped in 200 ml of aqueous solution containing 0.5 g of $NaBH_4$ and left at room temperature for 30 minutes. The solids were filtered off with suction, followed by rinsing with water and drying at 120° C. for 30 minutes.

The catalyst thus obtained was shaken in 500 ml of 3% hydrogen peroxide solution at room temperature for 1 hour, followed by drying at 20° C. for 2 hours for oxidation treatment. The resulting catalyst containing 12.6 mg of Pt per gram of activated carbon was designated as A-2.

For comparison, Sample B-4 (containing 12.6 mg of Pt per gram of activated carbon) was prepared in the same manner as in Sample A-2, except that the treatment with hydrogen peroxide was replaced by heating (oxidation) with hot air at 300° C. for 3 hours. Sample A-2 was examined for catalyst activity in the same manner as in Example 1 (the space velocity was 5,300 hr$^{-1}$ and the CO content at inlet was 2,350 ppm). The average CO concentration was 14 ppm (equivalent to a rate of conversion of 99.4%) in 2 minutes after the start. Table 2 shows the change of CO concentration with time.

TABLE 2

| Time | 10 sec | 2 min | 3 min | 3.5 min | 6 min |
|---|---|---|---|---|---|
| CO concentration at outlet (ppm) | 3.5 | 4.5 | 5.3 | 4.5 | 3.8 |

In the case of Comparative Sample B-4 examined under the same conditions as above, the average CO concentration in the initial 2 minutes was 482 ppm (equivalent to a rate of conversion of 79.5%). The CO concentration after 1 minute was 35 ppm and it increased to 1760 ppm after 12 minutes.

EXAMPLE 3

Three hundred grams of activated carbon was pretreated in the same manner as in A-1. The pretreated activated carbon was treated in the same manner as in A-1, except that the amount of $H_2PtCl_6.6H_2O$ was changed to 5.5 g (about 2.07 g as Pt). The oxidation treatment was performed with 3 liters of 3% hydrogen peroxide solution. The resulting catalyst was designated as Sample A-2. For comparison, Sample B-5 was prepared without treatment with hydrogen peroxide. Both A-3 and B-5 contain 6.9 mg of Pt per gram of activated carbon.

The catalysts were examined for catalyst activity in the same manner as in Example 1 (the space velocity was 5,000 hr$^{-1}$ and the CO content at inlet was 2,510 ppm). In the case of Sample A-3, the CO concentration at outlet was 18 ppm after 6 minutes, 24 ppm after 15 minutes, and 43 ppm after 30 minutes. In contrast, in the case of Sample B-5, the CO concentration at outlet was 67 ppm after 5 minutes and 110 ppm after 10 minutes. Thus it was shown that Sample A-3 conforming to the present invention has a much higher efficiency.

The effect of the amount of Pt on conversion efficiency is summarized below on the basis of the results in Example 1 to 3. As the amount of Pt decreases in the order of Sample A-1 (20.3 mg/g activated carbon), Sample A-2 (12.6 mg/g activated carbon), Sample A-3 (6.9 mg/g activated carbon), and Sample B-1 (5.2 mg/g activated carbon), the initial CO concentration at outlet increases accordingly, i.e., 2 ppm or less, 4 ppm, 18 ppm, and 510 ppm. Because the CO concentration at outlet should be lower than about 18 ppm in practical operation, the amount of supported Pt should be more than 6 mg per gram of activated carbon.

EXAMPLE 4

Commercial activated carbon was pretreated by continuously washing with 1N HCl at 100° C. for 20 hours and then washed with distilled water at 100° C. for 40 hours, followed by drying at room temperature.

The pretreated activated carbon was degassed in a vacuum of $8 \times 10^{-2}$ Torr and then treated with TFE vapor under normal pressure until an equilibrium was reached. TFE was polymerized by irradiation of γ-rays from Co-60. Different samples were prepared by varying the dose of γ-rays and the amount of TFE absorbed, and comparative samples with no TFE modification were prepared. These samples were examined for water absorption and CO conversion efficiency. The results are shown in Table 3.

Water absorption was measured by so-called climate chamber method. According to this method, moisture-saturated air (at 37° C.) is passed through a 10 ml activated carbon column at a flow rate of 1000 ml/min for 24 hours. The water absorption is expressed in terms of a difference between the values of weight measured before and after the operation. The degree of modification is expressed by the following three values.

(1) Water absorption (g)
(2) Rate of water absorption (water absorption/dry weight)
(3) Degree of modification [rate of water absorption (modified)/rate of water absorption (unmodified)]

The conversion efficiency was measured according to the method mentioned in Example 1.

The supporting of platinum was performed by either method (E) or method (Y) given below so that the amount of supported platinum is more than 6 mg per gram of activated carbon.

Method (E): Modified activated carbon is dipped in an aqueous solution of $H_2PtCl_6$ at 90° C. for 4 hours, and the absorbed $H_2PtCl_6$ is reduced with $KBH_4$.

Method (Y): Modified activated carbon is dipped in an alcoholic solution of $H_2PtCl_6$, and the absorbed $H_2PtCl_6$ is reduced with $H_2$ at 300° C. for 8 hours.

TABLE 3

| Sample No. | Absorption of TFE (Nml/g AC) | Dose (Rad) | Dry weight (g) | Water absorption (g) | Rate of water absorption | Modification | Pt supporting method | Conversion efficiency (%) Dry (SV) 4600 | 9200 | 13800 | Moist (SV) 4600 | 9200 | 13800 |
|---|---|---|---|---|---|---|---|---|---|---|---|---|---|
| A-4 | 84.15 | 2.3 × 10$^6$ | 4.4962 | 1.2077 | 0.269 | 0.75 | Y | 98.2 | 59.6 | 22.8 | 96.1 | 91.2 | 75.5 |
| A-5 | 84.15 | 2.3 × 10$^6$ | 4.4962 | 1.2077 | 0.269 | 0.75 | E | 100 | 100 | 15.5 | 100 | 93.0 | 88.8 |

TABLE 3-continued

| Sample No. | Absorption of TFE (Nml/g AC) | Dose (Rad) | Dry weight (g) | Water absorption (g) | Rate of water absorption | Modification | Pt supporting method | Conversion efficiency (%) Dry (SV) 4600 | 9200 | 13800 | Moist (SV) 4600 | 9200 | 13800 |
| --- | --- | --- | --- | --- | --- | --- | --- | --- | --- | --- | --- | --- | --- |
| A-6 | 83.41 | 4.8 × 10⁴ | 4.9711 | 1.0751 | 0.216 | 0.60 | Y | 73.3 | 11.1 | 11.1 | 96.7 | 88.9 | 83.3 |
| A-7 | 81.59 | 3.6 × 10⁴ | 4.7450 | 1.5216 | 0.321 | 0.89 | Y | 12.9 | 3.6 | — | 84.5 | 48.3 | — |
| A-8 | 71.49 | 1.1 × 10⁵ | 4.8628 | 1.5044 | 0.309 | 0.86 | Y | 100 | 67.0 | 54.0 | 99.0 | 97.0 | 87.0 |
| A-9 | — | — | 4.4608 | 1.6325 | 0.366 | 1.01 | E | 72.6 | — | — | 25.0 | 44.0 | — |

EXAMPLE 5

Activated carbon was dipped in a solution of trimethoxyvinylsilane in a mixture of water and acetone for 24 hours, followed by drying. The amount of silane supported was 0.1 wt %.

The silane-supporting activated carbon was treated with TFE under the same condition as in Example 1. Irradiation was not performed.

The resulting catalysts were examined for water absorption and conversion efficiency. The results are shown in Table 4.

TABLE 4

| Sample No. | Absorption of TFE (Nml/g AC) | Loading of silane (wt %) | Dry weight (g) | Water absorption (g) | Rate of water absorption | Modification | Pt supporting method | Conversion efficiency (%) Dry (SV) 4600 | 9200 | 13800 | Moist (SV) 4600 | 9200 | 13800 |
| --- | --- | --- | --- | --- | --- | --- | --- | --- | --- | --- | --- | --- | --- |
| A-10 | 49.14 | 0.1 | 5.9328 | 1.0980 | 0.185 | 0.51 | Y | 45.2 | 19.2 | 19.2 | 60.8 | 62.9 | 56.7 |
| A-11 | 49.14 | 0.1 | 5.9328 | 1.0980 | 0.185 | 0.51 | E | 100 | 79.4 | 7.2 | 92.3 | 89.5 | 79.2 |

It is noted from Table 3 that as the catalysts increase in the degree of modification (the smaller the value, the less the water absorption), they increase in conversion efficiency under moist condition. Thus the relation between the degree of modification and the conditions was examined.

Activated carbon was dipped in a solution of trimethoxyvinylsilane of different concentration in a mixture of water and acetone, followed by drying. Activated carbon supporting a different amount of silane was irradiated with γ-rays from Co-60, followed by drying.

The resulting CO conversion catalysts were examined for water absorption. The results are shown in Table 5. Incidentally, the silane-modified activated carbon is more hydrophobic than the TFE-modified one, and it will apparently exhibit a very high conversion efficiency under moist conditions. Therefore, the conversion efficiency was not measured.

TABLE 5

| Sample No. | Loading of silane (wt %) | Dose (Rad) | Dry weight (g) | Water absorption (g) | Rate of water absorption | Degree of modification |
| --- | --- | --- | --- | --- | --- | --- |
| A-12 | 0.1 | 0 | 5.6650 | 1.1864 | 0.209 | 0.58 |
| A-13 | 0.1 | 3.7 × 10³ | 5.7168 | 1.2412 | 0.217 | 0.60 |
| A-14 | 0.1 | 8.0 × 10³ | 5.5129 | 1.2202 | 0.221 | 0.61 |
| A-15 | 0.1 | 3.7 × 10⁴ | 5.7056 | 1.1916 | 0.209 | 0.58 |
| A-16 | 0.1 | 1.9 × 10⁵ | 5.7019 | 1.2430 | 0.218 | 0.60 |
| A-17 | 0.1 | 8.6 × 10⁵ | 5.6490 | 1.2000 | 0.212 | 0.59 |
| A-18 | 1.0 | 0 | 5.4358 | 1.1753 | 0.216 | 0.60 |
| A-19 | 1.0 | 3.7 × 10³ | 5.7007 | 1.2050 | 0.211 | 0.58 |
| A-20 | 1.0 | 8.0 × 10³ | 5.7079 | 1.1847 | 0.208 | 0.58 |
| A-21 | 1.0 | 3.7 × 10⁴ | 5.7191 | 1.2172 | 0.213 | 0.59 |
| A-22 | 1.0 | 8.0 × 10⁴ | 5.5698 | 1.2508 | 0.225 | 0.62 |
| A-23 | 1.0 | 8.0 × 10⁴ | 5.7747 | 1.2136 | 0.210 | 0.58 |
| A-24 | 5.26 | 0 | 5.3025 | 1.1461 | 0.216 | 0.60 |
| A-25 | 5.26 | 8.0 × 10³ | 5.6323 | 1.1577 | 0.171 | 0.47 |
| A-26 | 5.26 | 8.0 × 10³ | 5.5775 | 1.1909 | 0.214 | 0.57 |
| A-27 | 5.26 | 3.7 × 10⁴ | 5.6028 | 1.1749 | 0.210 | 0.58 |
| A-28 | 5.26 | 1.9 × 10⁵ | 5.6214 | 1.1346 | 0.202 | 0.56 |
| A-29 | 5.26 | 1.9 × 10⁵ | 5.4357 | 1.1873 | 0.218 | 0.60 |
| A-30 | 10.2 | 0 | 4.6913 | 1.3672 | 0.291 | 0.81 |
| A-31 | 10.2 | 4.0 × 10⁴ | 4.7080 | 1.3151 | 0.279 | 0.77 |
| A-32 | 10.2 | 4.4 × 10⁵ | 4.7086 | 1.4081 | 0.299 | 0.83 |
| A-33 | 10.2 | 2.4 × 10⁶ | 4.6842 | 1.4567 | 0.311 | 0.86 |

What is claimed is:

1. A process for producing a carbon monoxide conversion catalyst having improved performance under moist conditions comprising
   (i) applying to an activated carbon support a monomer that forms a hydrophobic polymer and polymerizing the monomer on the activated carbon support by irradiation;
   (ii) supporting platinum on the treated activated carbon support by dipping said support in a solution of chloroplatinic acid for impregnation, drying the dipped support to evaporate the solvent in the solution and reducing the chloroplatinic acid on the support to platinum with an aqueous reducing agent selected from the group consisting of $KBH_4$ and $NaBH_4$, and
   (iii) oxidizing residual reducing agent by treatment of the platinum carrying, hydrophobic activated carbon support with hydrogen·peroxide.

2. The processs of claim 1 further comprising neutralizing the chloroplatinic acid on the dipped activated carbon support with an aqueous solution of sodium carbonate prior to drying.

3. A process as set forth in claim 1, wherein the monomer is trimethoxyvinylsilane and is applied to the activated carbon support by dipping the support in a 1 to 10% solution of the monomer in a mixed solvent of water and acetone, followed by drying.

4. A process as set forth in claim 1, wherein the monomer is tetrafluoroethylene and is applied to the activated carbon support, which has been degassed under reduced pressure, as a vapor under pressure and is absorbed by the activated carbon support until equilibrium is reached.

5. A process as set forth in the claim 1, wherein the monomer is selected from the group consisting of trimethoxyvinylsilane, tetrafluoroethylene, and mixtures thereof.

6. A process as set forth in claim 1 wherein the monomer is trimethoxyvinylsilane and the irradiation is performed at a dose of $3.7 \times 10^3$ to $2.4 \times 10^6$ rad.

7. A process as set forth in claim 1, wherein the monomer is tetrafluoroethylene and the irradiation is performed at a dose of $4.8 \times 10^4$ to $2.3 \times 10^6$ rad.

8. A process for producing a carbon monoxide conversion catalyst having improved performance under moist conditions comprising
   (i) supporting platinum on an activated carbon support by dipping said support in a solution of chloroplatinic acid for impregnation, drying the dipped support to evaporate the solvent, reducing the chloroplatinic acid on the support to platinum with an aqueous reducing agent selected from the group consisting of $KBH_4$ and $NaBH_4$ and oxidizing residual reducing agent by treatment with hydrogen peroxide, and
   (ii) treating the platinum carrying support with a monomer that forms a hydrophobic polymer and polymerizing the monomer on the platinum carrying support by irradiation.

9. A process as set forth in claim 8, wherein the monomer is selected from the group consisting of trimethoxyvinylsilane, tetrafluoroethylene and mixtures thereof.

10. A process as set forth in claim 8, wherein the monomer is trimethoxyvinylsilane and the irradiation is performed at a dose of $3.7 \times 10^3$ to $2.4 \times 10^6$ rad.

11. A process as set forth in claim 8, wherein the monomer is tetrafluoroethylene and the irradiation is performed at a dose of $4.8 \times 10^4$ to $2.3 \times 10^6$ rad.

12. The process of claim 8, further comprising neutralizing the chloroplatinic acid on the dipped activated carbon support with an aqueous solution of sodium carbonate prior to drying.

13. The process of claim 8 wherein the monomer is trimethoxyvinylsilane and is applied to the platinum carrying support by dipping the support in a 1 to 10% solution of the monomer in a mixed solvent of water and acetone, followed by drying.

14. A process as set forth in claim 8, wherein the monomer is tetrafluoroethylene and is applied to the platinum carrying support, following degassing of the support as a vapor under pressure and is absorbed by the support until equilibrium is reached.

* * * * *